No. 624,443. Patented May 9, 1899.
S. BAKER.
HOLDER FOR POT OR KETTLE COVERS.
(Application filed Oct. 6, 1898.)
(No Model.)
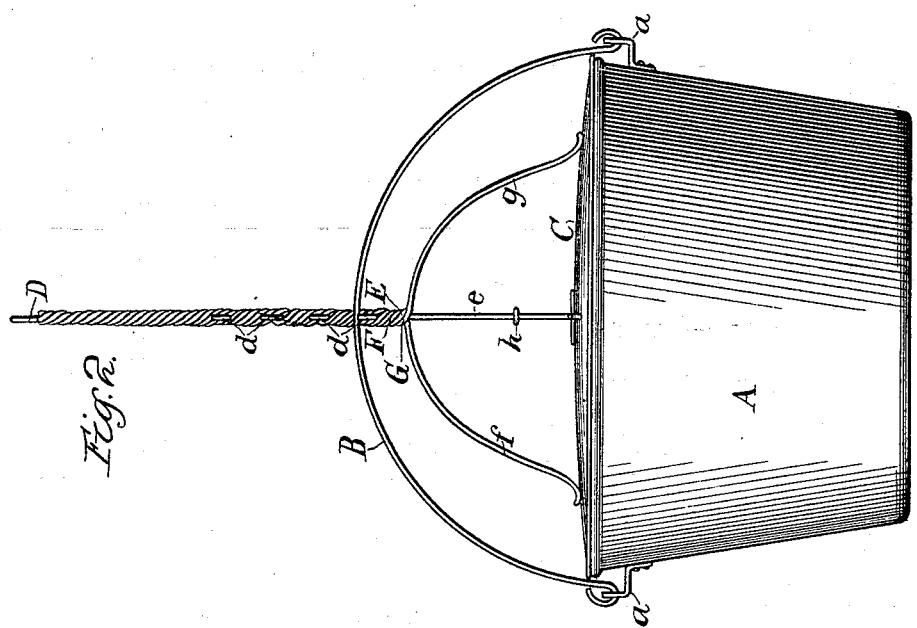
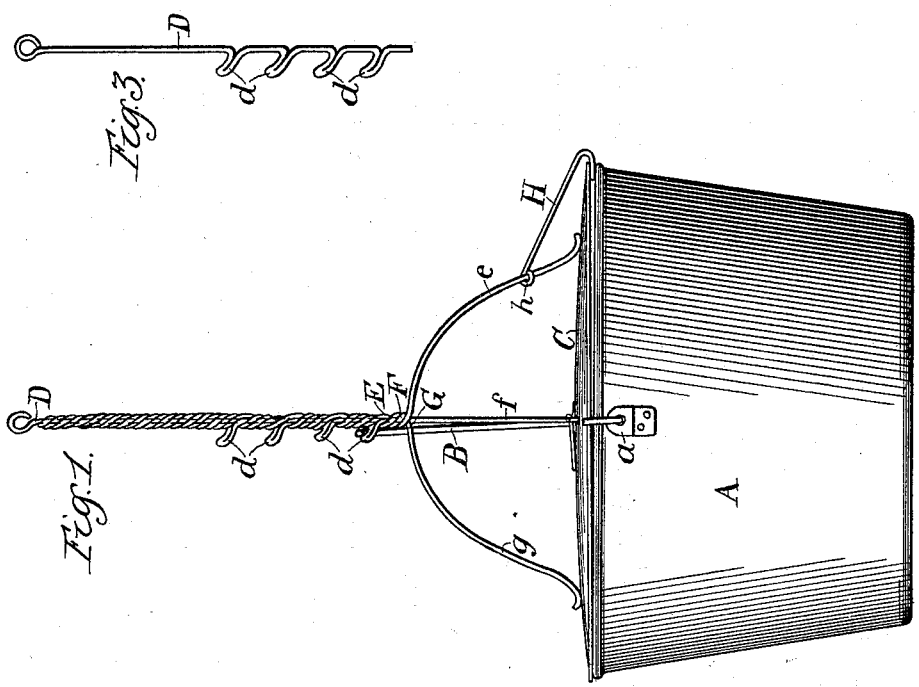
Witnesses.
Wm M. Rheem
H. G. Barrett
Inventor
Silas Baker

UNITED STATES PATENT OFFICE.

SILAS BAKER, OF PAW PAW, ILLINOIS.

HOLDER FOR POT OR KETTLE COVERS.

SPECIFICATION forming part of Letters Patent No. 624,443, dated May 9, 1899.

Application filed October 6, 1898. Serial No. 692,868. (No model.)

*To all whom it may concern:*

Be it known that I, SILAS BAKER, a citizen of the United States, residing at Paw Paw, in the county of Lee and State of Illinois, have invented a new and useful Holder for Pot or Kettle Covers, of which the following is a specification.

My invention relates to holders for pot and kettle covers, and has for its object the production of an improved holder fashioned of wire, capable of being made at minimum cost, that will fit any pot, and that may be caused to fix the position of the cover either at or below the mouth of the pot.

My invention consists of a central vertical element, which is a wire bent closely outward and back at a number of points in its length, the result being a series of projections. To give rigidity and strength to the central wire, other wires are twisted about it, the lower ends of the twisted wires being extended to form (usually three) legs, upon which the whole rests.

Another feature of my invention is an L-shaped wire having an eye at the end of its longer part encircling one leg of the device. This element is intended to be hooked under the edge of the lid, thereby raising it slightly and enabling water to be poured off the contents of the pot without disturbing the holder.

Each constituent element of my invention is described in detail and its individual office, together with the mode of operation of the whole, fully explained hereinbelow.

Of the accompanying drawings, throughout which like letters designate like parts, Figure 1 represents a side view of my invention in position upon the lid of a pot, a portion of the bail being cut away to avoid confusing the view of essential parts otherwise partially hidden by it. In this view is shown the L-shaped lid-raiser movably secured to one leg of the tripod. Fig. 2 is a front view of my invention in position upon the lid of a pot, this view being taken from a point at right angles to the point of view of the first figure; and Fig. 3 is a side view of the wire bent to form the series of bail-hooks.

Considering Figs. 1 and 2, the letter A marks the body of a pot, having pierced ears $a\ a$ diametrically opposite each other and engaging the hook ends of a bail B of customary form. The cover of the pot is marked C and may be in certain instances small enough to enter the mouth of the pot.

Of the invention proper the central element consists of a wire D, (see also Fig. 3,) having closed projecting bends $d$ along its length. Bends or bail-hooks $d$ as a rule are slightly inclined to the body of the wire, about as drawn.

Letters E, F, and G mark the three wires which are twisted about wire D and serve to strengthen and stiffen it. It will be noted that the three wires are shown in the illustrations Figs. 1 and 2 as twisted helically between the bail-hooks $d$. This specific construction may, it is believed, within the scope of my invention be modified by twisting the three wires around the lower and upper portions of wire D that are free from bail-hooks (see Fig. 3 also) and extending the three wires in direct lines parallel and contiguous to wire D between such upper and lower twists. When the whole is tinned, as all these holders are in practice, the wire D is additionally secured to the three wires.

Letters $e$, $f$, and $g$ refer to the continuations of the three wires E, F, and G to form the legs.

An L-shaped piece of wire H is movably secured by an eye $h$ to one of the legs—say $e$— and if the bent end of wire H is passed beneath the edge of lid C a sufficient vent for steam or for pouring off water is afforded.

Assume that the contents of the pot do not reach the mouth of the vessel and it is expedient to closely cover such contents. The lid being lowered within the vessel, the bail B is hooked over one of the upper hooks $d$, the legs of the device following and resting upon the lid, as usual. In the drawings the lid rests upon the edge of the pot and the bail engages the lowest hook $d$. Being formed of wire, the legs possess considerable elasticity, and if the bail when turned into a vertical position does not quite reach any given hook $d$ the legs may be sprung somewhat to accomplish the engagement between bail and hook.

I am aware that a holder has been constructed having a vertical series of bail-hooks and a base adapted to bear upon the pot-lid, and I do not claim those features broadly.

What I claim, and desire to secure by Letters Patent of the United States, is—

1. In a holder for pot and kettle covers, the combination of a wire D having bail-hook bends $d$, and additional wires twisted about said wire D whereby it is stiffened and strengthened, said additional wires being extended downwardly to form legs, substantially as described.

2. In a holder for pot and kettle covers, the combination of a series of bail-hooks, a support for said bail-hooks, said support having suitable legs, and an L-shaped wire movably secured to one of said legs, substantially as described.

SILAS BAKER.

Witnesses:
CHAS. F. PRESTON,
JOHN C. CROWELL,
H. H. BRISTOW.